United States Patent [19]

Dimpfl et al.

[11] 4,434,147

[45] Feb. 28, 1984

[54] SIMULTANEOUS SULFUR OXIDE AND NITROGEN OXIDE CONTROL IN FCC UNITS USING CRACKING CATALYST FINES WITH AMMONIA INJECTION

[75] Inventors: William L. Dimpfl, Oakland; William A. Blanton, Woodacre, both of Calif.

[73] Assignee: Chevron Research Company, San Francisco, Calif.

[21] Appl. No.: 387,292

[22] Filed: Jun. 10, 1982

Related U.S. Application Data

[63] Continuation-in-part of Ser. No. 308,689, Oct. 5, 1981, abandoned.

[51] Int. Cl.$^3$ .................. C01B 21/00; B01J 8/00
[52] U.S. Cl. .................. 423/235; 423/239; 423/244; 208/113; 208/120; 208/254 R; 502/38; 502/42
[58] Field of Search .................. 423/235, 235 D, 239, 423/239 A, 244 A, 244 R; 208/254 H, 254 R, 113, 120; 252/411 R, 417

[56] References Cited

U.S. PATENT DOCUMENTS

| | | | |
|---|---|---|---|
| 3,454,355 | 7/1969 | Ryason | 423/230 |
| 3,895,094 | 7/1975 | Carter et al. | 423/239 |
| 4,002,723 | 1/1977 | Inaba et al. | 423/239 |
| 4,033,726 | 7/1977 | Reed | 423/210 |
| 4,071,436 | 1/1978 | Blanton et al. | 208/120 |
| 4,075,283 | 2/1978 | Shiraishi et al. | 423/239 |
| 4,104,361 | 8/1978 | Nishikawa et al. | 423/239 |
| 4,115,251 | 9/1978 | Flanders et al. | 208/120 |
| 4,153,535 | 5/1979 | Vassalos et al. | 208/120 |
| 4,199,435 | 4/1980 | Chessmore et al. | 208/120 X |
| 4,235,704 | 11/1980 | Luckenbach | 423/235 |
| 4,309,309 | 1/1982 | Blanton | 208/113 |
| 4,314,913 | 2/1982 | Derrien et al. | 252/464 |

FOREIGN PATENT DOCUMENTS

| | | | |
|---|---|---|---|
| 528975 | 1/1975 | Japan | 423/235 |
| 1388669 | 3/1975 | United Kingdom | 423/235 |

Primary Examiner—Gregory A. Heller
Attorney, Agent, or Firm—D. A. Newell; S. R. LaPaglia; J. W. Ambrosius

[57] ABSTRACT

Sulfur oxide and nitrogen oxide control by use of a sulfur sorbent and sulfur dioxide oxidation promoter in the regenerator and downstream removal of nitrogen oxides by selective catalytic reduction using ammonia injection and trapped cracking catalyst fines.

7 Claims, 1 Drawing Figure

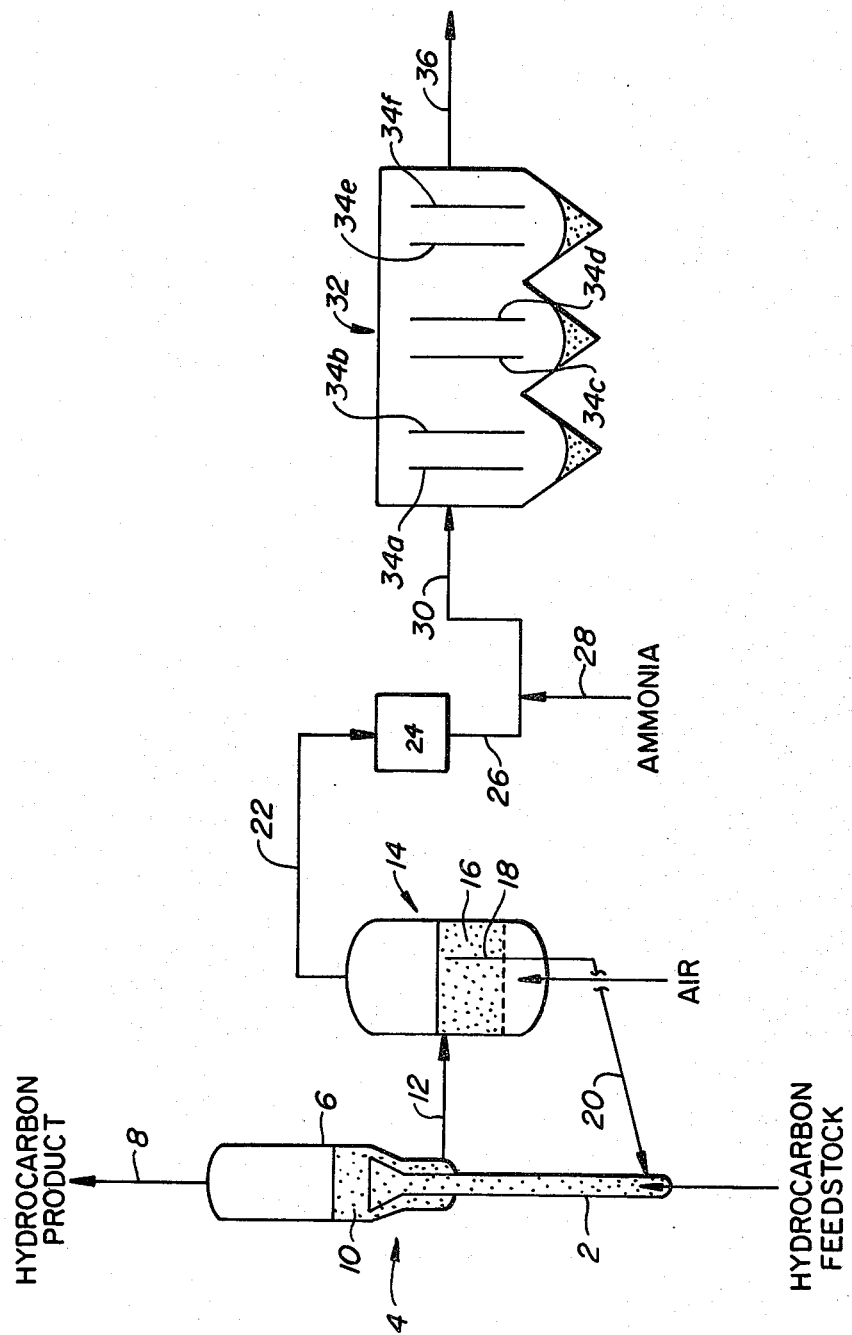

SIMULTANEOUS SULFUR OXIDE AND NITROGEN OXIDE CONTROL IN FCC UNITS USING CRACKING CATALYST FINES WITH AMMONIA INJECTION

CROSS-REFERENCE TO RELATED APPLICATIONS

This application is a continuation-in-part of copending U.S. patent application Ser. No. 308,689, filed Oct. 5, 1981, now abandoned the contents of which are herein incorporated by reference.

BACKGROUND OF THE INVENTION

In the typical fluid catalytic cracking unit (FCC unit), a particulate catalyst is cycled between a cracking zone in which the hydrocarbon feedstream is cracked and a regeneration zone in which the coke deposited on the catalyst is burned off in the presence of oxygen. Since the coke generally contains some sulfur compounds (the amount usually depends on the sulfur content of the hydrocarbon feed), during regeneration significant amounts of sulfur dioxide and sulfur trioxide are formed. These sulfur oxides formed in the regenerator may be controlled by including in the circulating inventory of the unit a sulfur oxide sorbent, such as reactive alumina, capable of sorbing the sulfur oxides in the regenerator and releasing them as hydrogen sulfide in the presence of hydrocarbons in the cracking vessel.

The efficiency of such a sulfur oxides control system is enhanced by the presence of a sulfur dioxide oxidation promoter, such as platinum. These sufur dioxide oxidation promoters aid in the formation of sulfur trioxide in the regenerator which is more readily sorbed by the sulfur oxide sorbent than sulfur dioxide. However, a disadvantage of this method of controlling sulfur oxides is that the promoter has been observed to increase the amount of nitrogen oxides present in the regenerator flue gas. Since the oxides of nitrogen are themselves noxious gases, it is desirable to control the amount of nitrogen oxides, especially nitric oxide (NO), in the flue gas.

SUMMARY OF THE INVENTION

The present invention is directed to a process for lowering the amount of nitrogen oxides in a flue gas from a regenerator of a fluid catalytic cracking unit in which the circulating inventory of the unit contains at least a particulate cracking catalyst, containing at least 20% alumina, a sulfur oxide sorbent, and a sulfur dioxide oxidation promoter, including the steps of:

(a) lowering the temperature of the flue gas to at least about 850° F.;

(b) mixing sufficient ammonia or an ammonia generating compound with the flue gas to achieve the desired reduction of said nitrogen oxide;

(c) passing the flue gas in the presence of oxygen through means for collecting and supporting cracking catalyst fines entrained in the flue gas; and (d) controlling the temperature of the flue gas as it passes through said collecting and supporting means to between about 350° F. and about 850° F., whereby the nitrogen oxide in the flue gas is reduced as it contacts the supported catalyst in the collecting and supporting means.

As used herein, the term "nitrogen oxide" or "nitrogen oxides" refers to the various oxides of nitrogen which may be present in the flue gas leaving the regenerator. Thus the term refers to nitric oxide (NO), nitrogen dioxide ($NO_2$), nitrogen peroxide ($N_2O_4$), nitrogen pentoxide ($N_2O_5$), and mixtures thereof. The process herein described is especially concerned with the reduction and control of nitric oxide, since nitric oxide typically comprises greater than 90% of the nitrogen oxides in regenerator flue gas.

The particulate solids cycled between the cracking vessel and the regenerator of the FCC unit are referred to as the "circulating inventory". In the present process the circulating inventory will include at least a particulate cracking catalyst, a sulfur sorbent, and a sulfur dioxide oxidation promoter. Other optional materials may be included in the circulating inventory such as a carbon monoxide oxidation promoter for oxidizing carbon monoxide to carbon dioxide. Generally, the presence of such optional materials will not significantly effect the process disclosed herein.

BRIEF DESCRIPTION OF THE DRAWING

The FIGURE is a flow diagram illustrating one method for carrying out the invention.

DETAILED DESCRIPTION OF THE INVENTION

The invention may be most easily explained by referring to the drawing. Hot coke-free catalyst particles contact and vaporize the hydrocarbon feedstock entering the bottom of the riser 2 of the cracking vessel 4. The vaporized hydrocarbon carries the catalyst up the riser into the reactor 6. The cracked hydrocarbon (product) leaves the top of the reactor via outlet 8. The catalyst particles are retained in a bed of particles 10 in the lower part of the reactor. During cracking of the hydrocarbon coke is deposited on the catalyst.

The coked catalyst passes via conduit 12 to the regenerator 14. In the regenerator coke on the catalyst is burned off in a fluidized bed 16. Oxygen for combustion and fluidization gas is supplied by air entering the bottom of the regenerator. The regenerated catalyst is withdrawn from the fluidized bed 16 by a drawpipe 18 and returned to the riser 2 by conduit 20 for reuse in the cracking vessel 4.

Since the coke generally contains some sulfur compounds, when the coke is burned in the regenerator sulfur oxides, i.e., sulfur dioxide and sulfur trioxide, are formed. Unless some means is provided to control the release of the sulfur oxides from the regenerator they will be carried away with the other combustion gases through the flue gas exhaust pipe 22. In order to control the release of the sulfur oxides a sulfur oxide sorbent, such as reactive alumina, is included with the catalyst in the circulating inventory. In the reducing environment of the cracking vessel, the sulfur oxide sorbent releases the sorbed sulfur as hydrogen sulfide which is readily scrubbed from the hydrocarbon product leaving the cracking vessel 4 via outlet 8. A more detailed description of the use of the sulfur oxide sorbent may be found in U.S. Pat. Nos. 4,071,436 and 4,115,249, incorporated herein by reference.

The sulfur oxide sorbent usually has a much greater affinity for sulfur trioxide than for sulfur dioxide. Therefore, in order to improve sulfur oxide control a sulfur dioxide oxidation promoter, such as platinum, is also included in the circulating inventory to aid in the formation of sulfur trioxide in preference to sulfur dioxide. The sulfur dioxide oxidation promoter has been observed to also favor the formation of the oxides of nitrogen, especially nitric oxide. The nitrogen oxides leave the regenerator with the other combustion gases and some oxygen via the flue gas exhaust pipe 22. During operation of an FCC unit as described above the combustion gas will generally contain between about 400 and 1300 ppm of nitrogen oxides.

The combustion gases and nitrogen oxides pass through a flue gas cooler 24 in which the gases are cooled to a temperature of about 850° F. The cooled gas leaves the flue gas cooler via conduit 26 and is mixed with ammonia entering via ammonia inlet 28. Alternately, the ammonia may be mixed with the hot flue gas by adding the ammonia into the flue gas exhaust pipe 22 before the flue gas coler 24. The mixture of ammonia and combustion gases pass via conduit 30 to the electrostatic precipitator 32. The gases should enter the electrostatic precipitator at a temperature of from about 350° F. to about 850° F.

In addition to the nitrogen oxides, the combustion gases carry entrained catalyst fines. The catalyst fines collect on plates 34a, 34b, 34c, 34d, 34e and 34f contained in the electrostatic precipitator. The plates also serve as a support for the catalyst fines to aid in contacting the combustion gases with the catalyst. The mixture of combustion gases and ammonia pass through the electrostatic precipitator where the nitrogen oxides contact the catalyst fines supported on the plates. In the presence of the catalyst the ammonia reduces the nitrogen oxides to elemental nitrogen. Water is also believed to be a product of the reduction. The combustion gas with significantly lower amounts of nitrogen oxides present leave the electrostatic precipitator via conduit 36. Further treatment of the combustion gas may be desirable such as passing the gas through a CO boiler to reduce the carbon monoxide content. Such additional treatment is optional and does not constitute a part of this invention which is concerned principally with the control of sulfur oxides and nitrogen oxides.

The electrostatic precipitator is a convenient means for collecting and supporting the catalyst fines that serve to catalyze the reaction of ammonia and nitrogen oxides. Other means, such as filters, pebble beds, etc., could be used to collect and support the fines. Such collecting and supporting means should offer sufficient surface area to promote efficient contacting between the combustion gases and the fines. In addition, the collecting and supporting means should not cause an unreasonably large pressure drop across its length.

The efficiency of the collecting and supporting means for promoting the contacting of the combustion gases and catalyst fines is a function of support geometric surface area and gas flow rate. The relationship is conveniently expressed by a constant referred to herein as "contact efficiency". The contact efficiency may be defined as the total support surface area divided by the gas volumetric flow rate at the conditions prevailing within the collecting device. Although the required contact efficiency will vary somewhat with the particular catalyst employed, of the catalysts actually tested a contact efficiency of at least 2 sec/cm is required to lower the amount of nitrogen oxides in the flue gas by about 20 to 30%. At a contact efficiency of about 11 sec/cm a reduction of about 90% of the nitrogen oxides has been achieved. Little additional nitrogen oxide control would be effected by increasing contact efficiency above about 20 sec/cm.

Generally, a conventional electrostatic precipitator designed only for removing fines from a flue gas has insufficient surface area on its collection plates for optimal contacting of the catalyst with the flue gas. Therefore, for the best results in carrying out this process, it is desirable to increase the surface area of the plates beyond what is needed for only removing fines from the gas. For example, the contact efficiency of a commerical electrostatic precipitator sufficient for removing fines from the flue gas of a commerical FCC unit was estimated to be 1.05 sec/cm giving nitrogen oxides control calculated to be about 15%. While significant, this amount of reduction may be insufficient to satisfy the emission objectives of the unit. In order to achieve 50% nitrogen oxides control a contact efficiency of about 3 sec/cm was calculated to be necessary.

The cracking catalyst is used in the present invention both for cracking the hydrocarbon feedstream and to act as a catalyst in the reduction of the nitrogen oxide with ammonia. Conventional cracking catalyst containing at least 20% alumina, more preferably at least 40% alumina, have been found suitable for use in this process. The cracking catalysts may contain a crystalline aluminosilicate zeolite, such as an ultrastable zeolite of the X- or Y-type, on or in various types of supports such as clay microspheres, amorphous silica/alumina, silica/clay, etc. Alternately, the cracking catalyst may be non-zeolitic cracking catalyst. Although usually the sulfur sorbent is present in the circulating inventory as separate particles from the cracking catalyst, under some circumstances it may be desirable to have the sulfur sorbent present on the catalyst particles. See U.S. Pat. No. 4,115,249.

Preferably, the sulfur oxide sorbent is reactive alumina which may be defined as alumina having a surface area of at least 50 $m^2g$, e.g., gamma- or eta-alumina. Reactive alumina is not in intimate combination with more than about 40 weight percent silica and is preferably free from silica. In addition to acting as a sulfur oxide sorbent the reactive alumina also aid in the reduction of the nitrogen oxides. Other sulfur sorbents have been described in the literature and could be used with the present invention so long as they do not significantly depress the catalytic activity of the cracking catalyst in reducing the nitrogen oxides. Such sorbents include various free and combined metals such as sodium, scandium, titanium, chromium, molybdenum, maganese, cobalt, nickel, antimony, copper, zinc, cadmium, lead, and the rare earth metals. See U.S. Pat. No. 4,206,039. The oxides of magnesium and calcium are also known to serve as sulfur sorbents and may be employed with the present invention. See U.S. Pat. No. 4,146,463.

The sulfur dioxide oxidation promoter is intended to aid in the formation of sulfur trioxide which is more readily sorbed by the sulfur sorbent than sulfur dioxide. A preferred sulfur dioxide oxidation promoter is platinum. Platinum may also serve as a carbon monoxide oxidation promoter. However, it has been found that for effective sulfur dioxide oxidation activity the platinum should be present in an amount in the range from about 0.01 to about 100 ppm of metal in the total circulating inventory. Generally, the sulfur dioxide oxidation promoter is present on a support which comprises a separate particle from either the principal cracking catalyst or sulfur sorbent. Such supports include alumina, silica/alumina, and cracking catalyst particles. Various types of combined particles containing the promoter on the sulfur sorbent have also been proposed.

During the period of contact between the combustion gases, ammonia, and cracking catalyst the temperature of the gases should be in the range of from about 350° F. to about 850° F., preferably between about 400° F. and 700° F. Since the combustion gases leave the regenerator at temperatures above 1000° F. some cooling of the combustion gases must take place before the reduction of the nitrogen oxides can take place. Preferably, the gases are cooled prior to the point of ammonia injection.

The ammonia is preferably introduced into the combustion gases at a point prior to contact with the zeolite to allow good mixing of the gases to occur. The ammonia may be added as ammonia or as an ammonia precursor, such as ammonium carbonate. The amount of ammonia present in the mixture is not critical so far as the reaction is concerned so long as at least a stoichiometric amount is present relative to the amount of nitrogen oxide to be controlled. Although some ammonia excess may be desirable, excessive amounts of ammonia may be undesirable since ammonia itself may act as an air pollutant when present in sufficient amounts. Therefore, in the absence of additional downstream treatment it is desirable to operate with a slight stoichiometric excess of ammonia. In the case of nitric oxide, a stoichiometric amount is one mole of ammonia to one mole of nitric oxide.

Although oxygen is believed to be necessary for the reduction of the nitrogen oxides in accordance with the invention, sufficient free oxygen generally remains mixed with the combustion gases leaving the regenerator for the process to occur. Therefore, additional oxygen generally need not be added to the gases prior to contact with the cracking catalyst. An oxygen content of at least about 0.5% is probably necessary for the proper operation of the process. Additional oxygen can be added if insufficient oxygen is present, as for example where the regenerator is operated in an oxygen lean mode.

What is claimed is:

1. A process for lowering the amount of nitrogen oxides in a flue gas from a regenerator of a fluid catalytic cracking unit in which the circulating inventory of the unit contains at least a particulate cracking catalyst containing at least 20% alumina, a sulfur oxide sorbent, and a sulfur dioxide oxidation promoter, including the steps of:
    (a) lowering the temperature of the flue gas to at least about 850° F.;
    (b) mixing sufficient ammonia or an ammonia generating compound with the flue gas to achieve the desired reduction of said nitrogen oxide;
    (c) passing the flue gas in the presence of oxygen through means for collecting and supporting cracking catalyst fines entrained in the flue gas; and
    (d) controlling the temperature of the flue gas as it passes through said collecting and supporting means to between about 350° F. and about 850° F., whereby the nitrogen oxide in flue gas is reduced as it contacts the supported catalyst in the collecting and supporting means.

2. The process of claim 1 wherein the temperature of the flue gas is controlled to between 400° F. and 700° F.

3. The process of claim 1 wherein the contact efficiency between the flue gas and the collecting and supporting means is at least 2 sec/cm.

4. The process of claim 3 wherein the contact efficiency is in the range of from 3 to 11 sec/cm.

5. The process of claim 1 wherein the collecting and contacting means is an electrostatic precipitator.

6. The process of claim 1 wherein the sulfur dioxide oxidation promoter is platinum.

7. The process of claim 1 wherein the cracking catalyst contains at least 40% alumina and the sulfur oxide sorbent is reactive alumina.

* * * * *

UNITED STATES PATENT AND TRADEMARK OFFICE
CERTIFICATE OF CORRECTION

PATENT NO. : 4,434,147
DATED : February 28, 1984
INVENTOR(S) : William L. Dimpfl; William A. Blanton It is certified that error appears in the above-identified patent and that said Letters Patent are hereby corrected as shown below:

Col. 1, line 32, "sufur" should read --sulfur--.

Col. 3, line 15, "coler" should read --cooler--.

Col. 4, line 8, "commerical" should read --commercial--.

Col. 4, line 10, "commerical" should read --commercial--.

Col. 4, line 26, "silica/-clay" should read --silica/clay--.

Signed and Sealed this

Eleventh Day of September 1984

[SEAL]

Attest:

Attesting Officer

GERALD J. MOSSINGHOFF

Commissioner of Patents and Trademarks